United States Patent
Kotoku et al.

(10) Patent No.: US 10,382,743 B2
(45) Date of Patent: Aug. 13, 2019

(54) IMAGE PROCESSING APPARATUS THAT GENERATES STEREOSCOPIC PRINT DATA, METHOD OF CONTROLLING THE IMAGE PROCESSING APPARATUS, AND STORAGE MEDIUM

(71) Applicant: CANON KABUSHIKI KAISHA, Tokyo (JP)

(72) Inventors: Hiromi Kotoku, Tokyo (JP); Akihiko Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 14/970,899

(22) Filed: Dec. 16, 2015

(65) Prior Publication Data

US 2016/0191894 A1    Jun. 30, 2016

(30) Foreign Application Priority Data

Dec. 25, 2014 (JP) ................................ 2014-262420

(51) Int. Cl.
*H04N 13/122* (2018.01)
*H04N 13/207* (2018.01)
*H04N 13/00* (2018.01)

(52) U.S. Cl.
CPC ......... *H04N 13/207* (2018.05); *H04N 13/122* (2018.05); *G06T 2207/10012* (2013.01);
(Continued)

(58) Field of Classification Search
CPC ............. H04N 19/597; H04N 13/0022; H04N 13/026; H04N 5/2628; H04N 13/128;
(Continued)

(56) References Cited

U.S. PATENT DOCUMENTS 8,422,766 B2 * 4/2013 Zhang ................. G06T 7/579
382/154
8,983,175 B2 * 3/2015 Plagne ................. G06T 7/0051
382/154
(Continued)

FOREIGN PATENT DOCUMENTS

JP    2008-244831 A    10/2008

OTHER PUBLICATIONS

Ideses et al., Real-time 2D to 3D video conversion, Oct. 2007 [retrieved Apr. 16, 2018], Journal of Real-Time Image Processing, vol. 2, Issue: 1,pp. 3-9. Retrieved from the Internet: https://link.springer.com/article/10.1007/s11554-007-0038-9.*

*Primary Examiner* — Andrew M Moyer
*Assistant Examiner* — Dennis Rosario
(74) *Attorney, Agent, or Firm* — Venable LLP

(57) ABSTRACT

An image processing apparatus includes a distance information acquisition unit that acquires distance information, associated with an object image included in each of a first image and a second image, and corresponding to a distance in a depth direction of the object, a calculation unit that calculates a movement vector of the object image, at least in a horizontal direction and a vertical direction, based on position information of the object image, and a generation unit that generates stereoscopic print data of the acquired second image, based on the second image, the distance information, and the movement vector, by increasing a depth component of the position information of the object image included in the second image based on at least part of the movement vector. In addition, a storing unit stores the generated stereoscopic print data in one of a second memory and a recording medium.

12 Claims, 10 Drawing Sheets

(52) U.S. Cl.
CPC ............... *H04N 2013/0081* (2013.01); *H04N 2013/0085* (2013.01)

(58) Field of Classification Search
CPC ......... H04N 13/122; H04N 2013/0088; H04N 2013/0074; G06T 2207/10016; G06T 7/579; G06T 2207/10028; G06T 7/20; G06T 2207/10021; G06T 7/593; G06T 2207/10012; G06T 15/205; G06T 7/55
See application file for complete search history.

(56) References Cited

U.S. PATENT DOCUMENTS

| | | | |
|---|---|---|---|
| 9,185,388 B2 * | 11/2015 | McNamer | H04N 13/0022 |
| 9,256,789 B2 * | 2/2016 | Adiletta | G08B 13/19608 |
| 9,262,839 B2 * | 2/2016 | Mori | G06T 7/2053 |
| 2011/0115790 A1 * | 5/2011 | Yoo | G06T 7/579 |
| | | | 345/419 |
| 2012/0105437 A1 * | 5/2012 | Yasuda | H04N 13/264 |
| | | | 345/419 |
| 2012/0327078 A1 * | 12/2012 | Liao | H04N 13/0022 |
| | | | 345/419 |

* cited by examiner

IMAGE PROCESSING APPARATUS THAT GENERATES STEREOSCOPIC PRINT DATA, METHOD OF CONTROLLING THE IMAGE PROCESSING APPARATUS, AND STORAGE MEDIUM

This application claims the benefit of Japanese Patent Application No. 2014-262420 filed Dec. 25, 2014, which is hereby incorporated by reference herein in its entirety.

BACKGROUND OF THE INVENTION

Field of the Invention

The present invention relates to an image processing apparatus, a method of controlling the image processing apparatus, and a storage medium. More particularly, the present invention relates to an image processing apparatus that generates stereoscopic print data for use in stereoscopic print processing, a method of controlling the image processing apparatus, and a storage medium.

Description of the Related Art

An image processing apparatus, such as a digital camera, generates print data for printing a photographed image, while a printing apparatus, such as a printer, performs print processing based on the generated print data. Further, when the image processing apparatus performs stereoscopic print processing for a photographed image, the image processing apparatus generates print data for performing the stereoscopic print processing (hereinafter referred to as the "stereoscopic print data"). As a technique for generating stereoscopic print data, for example, there has been known a technique for generating stereoscopic print data based on a photographed image and ranging information of an object in the photographed image (see Japanese Patent Laid-Open Publication No. 2008-244831). A printing apparatus dedicated to stereoscopic print processing performs stereoscopic print processing based on the generated stereoscopic print data, and outputs a three-dimensional printing result based on the stereoscopic print data.

In generating the stereoscopic print data, however, information indicating protrusions and indentations of an object can be easily acquired based on the ranging information of the object, but it is difficult to directly acquire information indicating the track of movement of an object that is moving (hereinafter referred to as the "moving body") from the ranging information. This brings about a problem that conventional image processing apparatuses cannot generate stereoscopic print data that gives a printing result expressing a feeling of lively movement of a moving body.

SUMMARY OF THE INVENTION

The invention provides an image processing apparatus that is capable of generating stereoscopic print data that gives a printing result expressing a feeling of lively movement of a moving body, a method of controlling the image processing apparatus, and a storage medium.

In a first aspect of the present invention, an image processing apparatus acquires a first image and a second image, the first image and the second image being photographed at different times, and each including an object image of an object, and that generates stereoscopic print data for use in stereoscopic print processing of the acquired second image. The image processing apparatus includes a distance information acquisition unit configured to acquire distance information associated with the object image included in each of the first image and the second image, a calculation unit configured to calculate a movement vector of the object image included in the second image based on the first image and the second image, and a generation unit configured to generate the stereoscopic print data, based on the second image, the distance information associated with the object image included in the second image, and the movement vector.

In a second aspect, the present invention provides a method of controlling an image processing apparatus that acquires a first image and a second image, the first image and the second image being photographed at different times, and each including an object image of an object, and that generates stereoscopic print data for use in stereoscopic print processing of the acquired second image. The method includes the steps of acquiring distance information associated with the object image included in each of the first image and the second image, calculating a movement vector of the object image included in the second image based on the first image and the second image, and generating the stereoscopic print data, based on the second image, the distance information associated with the object image included in the second image, and the movement vector.

In a third aspect of the present invention, a non-transitory computer-readable storage medium stores a computer-executable program for executing a method of controlling an image processing apparatus that acquires a first image and a second image, the first image and the second image being photographed at different times, and each including an object image of an object that generates stereoscopic print data for use in stereoscopic print processing of the acquired second image. The method includes the steps of acquiring distance information associated with the object image included in each of the first image and the second image, calculating a movement vector of the object image included in the second image based on the first image and the second image, and generating the stereoscopic print data, based on the second image, the distance information associated with the object image included in the second image, and the movement vector.

According to the inventions, it is possible to generate stereoscopic print data that gives a printing result expressing a feeling of lively movement of an object.

Further features of the present invention will become apparent from the following description of exemplary embodiments with reference to the attached drawings.

BRIEF DESCRIPTION OF THE DRAWINGS

FIG. 4A shows image information of an n-th image, FIG. 4B shows the image information that is divided into a plurality of blocks, FIG. 4C shows a distance from a photographing section to an object, FIG. 4D shows an object area, FIG. 4E shows gravity center position information of image information of an n−1-th image, FIG. 4F shows gravity center position information of the image information of the n-th image, and FIG. 4G shows the movement information of the object.

DESCRIPTION OF THE EMBODIMENTS

The present invention will now be described in detail below with reference to the accompanying drawings showing embodiments thereof.

Although in the present embodiment, the invention is applied to a digital camera as an image processing apparatus, the invention is not limitedly applied to the digital camera. That is, the invention can be applied to any other image processing apparatus, insofar as it is an image processing apparatus that is capable of generating stereoscopic print data for performing stereoscopic print processing.

Figure 1:
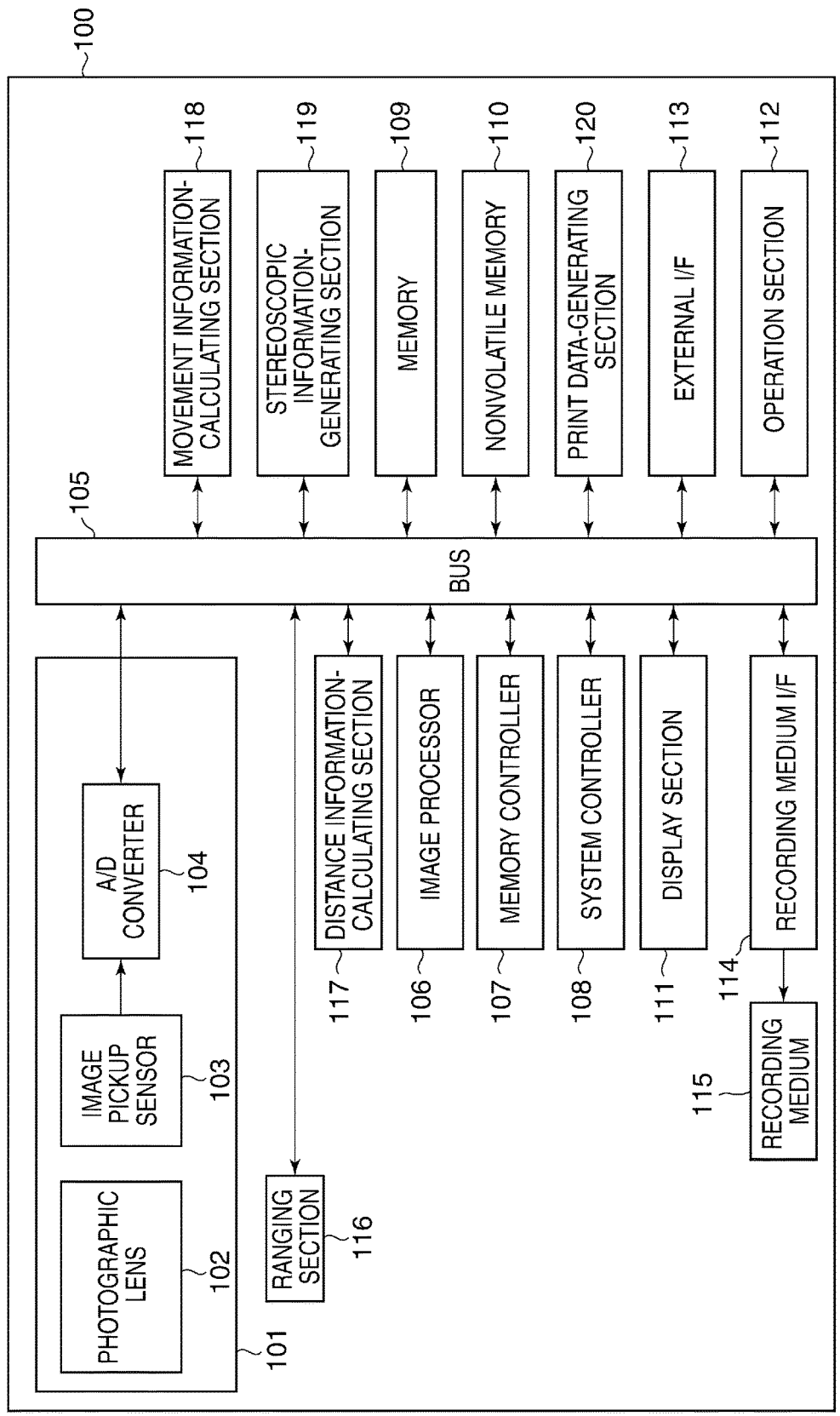
FIG. 1 is a schematic block diagram of a digital camera as an image processing apparatus according to an embodiment of the invention.

FIG. 1 is a schematic block diagram of the digital camera, denoted by reference numeral 100, as the image processing apparatus according to the embodiment of the invention.

Referring to FIG. 1, the digital camera 100 includes a photographing section 101, an image processor 106, a memory controller 107, a system controller 108, a memory 109, a nonvolatile memory 110, a display section 111, an operation section 112, an external interface 113, a recording medium interface 114, a ranging section 116, a distance information-calculating section 117, a movement information-calculating section 118, a stereoscopic information-generating section 119, and a print data-generating section 120. These components are interconnected via a bus 105. Further, a recording medium 115 and the recording medium interface 114 are connected to each other. The photographing section 101 includes a photographic lens 102, an image pickup sensor 103, and an A/D converter 104.

The photographing section 101 acquires image information of an object. More specifically, in the photographing section 101, the photographic lens 102 takes in an optical image of the object, the image pickup sensor 103 converts the acquired image information to an analog image signal, and the A/D converter 104 converts the converted analog image signal to a digital image signal. The photographing section 101 sends the digital image signal converted by the A/D converter 104 to the memory 109 and the recording medium 115, and the memory 109 and the recording medium 115 store the received digital image signal as image data. In the present embodiment, when the digital camera 100 is set to a photographing mode, preview processing is performed before the start of photographing to acquire a plurality of image information items from the photographing section 101 at different times.

The image processor 106 acquires the image data from the memory 109, and performs resize processing and color conversion processing on the acquired image data. Further, the image processor 106 performs calculation processing using the image information acquired by the photographing section 101, and sends a result of calculation to the system controller 108. The memory controller 107 manages various data stored in the memory 109. The system controller 108 performs centralized control of the overall operation of the digital camera 100 by executing various programs stored in the nonvolatile memory 110. For example, the system controller 108 delivers control signals for performing exposure control, ranging control, and optical control to the photographing section 101, based on results of calculation received from the image processor 106. The memory 109 stores the digital image signal sent from the photographing section 101 as image data. As the nonvolatile memory 110, e.g., an electrically erasable programmable read-only memory (EEPROM) is used to store various programs and various setting information. The display section 111 displays, e.g., image information acquired by preview processing. The operation section 112 sends various setting information set by a user's operation to the system controller 108. The external interface 113 performs data communication with various devices connected thereto, e.g., via a USB connector (not shown). The recording medium interface 114 performs data communication with the recording medium 115. The recording medium 115 is implemented, e.g., by a semiconductor memory or a magnetic disc. The memory 109 and the recording medium 115 store various data used in a movement information calculation process and a stereoscopic information calculation process, described hereinafter with reference to FIGS. 3 and 5, respectively.

Figure 2:
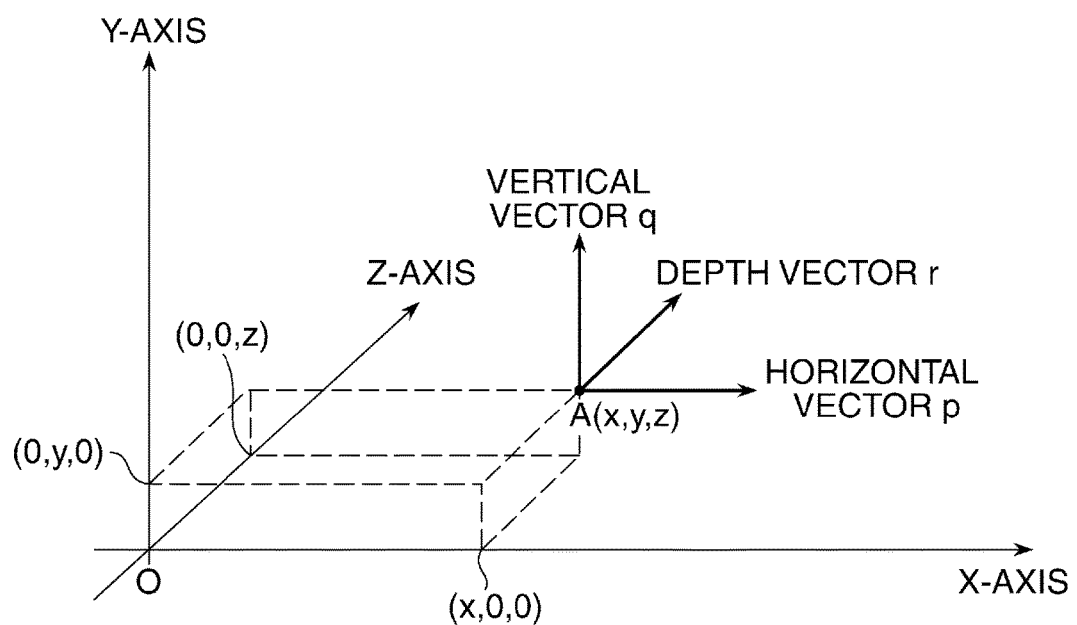
FIG. 2 is a diagram useful in explaining movement information calculated by a movement information-calculating section appearing in FIG. 1.

The ranging section 116 performs ranging processing on the plurality of image information items, respectively, that have been acquired by the photographing section 101 at different times, and sends ranging information acquired by the ranging processing to the distance information-calculating section 117. In the ranging processing, for example, an active method or a passive method is used. In the active method, for example, the ranging section 116 irradiates an object with light, such as infrared light, and calculates the ranging information based on, e.g., a time period until the irradiated light is reflected and returns to the ranging section 116. On the other hand, in the passive method, the ranging section 116 calculates the ranging information based on the image information acquired by the photographing section 101 without using infrared light or the like. The distance information-calculating section 117 calculates the distance information indicating a distance from the photographing section 101 to the object based on each image information item and the ranging information associated with the image information. The image information acquired by the photographing section 101 is divided into a plurality of blocks each having a predetermined size, and the distance information is calculated with respect to each divided block of the plurality of blocks. The movement information-calculating section 118 calculates movement information of a moving body that is a moving object based on differences between distance information items that are associated with respective image information items and calculated by the distance information-calculating section 117. The movement information is formed by amounts of movement in three dimensions in X, Y, and Z directions, that are represented by a horizontal vector p, a vertical vector q, and a depth vector r, appearing in FIG. 2. The stereoscopic information-generating section 119 calculates stereoscopic information indicating a thickness of an object image in a printing result based on the distance information and the movement information. The print data-generating section 120 generates stereoscopic print data based on the image information and the stereoscopic information. For example, an STL (Standard Triangle Language) or VRML (Virtual Reality Modeling Language) method is used for the stereoscopic print data.

Next, the movement information calculation process and the stereoscopic information calculation process in the present embodiment will be described with reference to FIGS. 3 and 5, respectively.

In generation of the stereoscopic print data, although information indicating protrusions and indentations of an object can be easily acquired based on the distance information indicating the distance to an object, it is difficult to acquire information indicating the track of a moving body directly from the distance information. Therefore, conventional image processing apparatuses cannot generate stereoscopic print data that gives a printing result expressing a feeling of lively movement of a moving body.

In contrast, in the present embodiment, the stereoscopic print data is generated based on the acquired image information, the distance information indicating a distance to an object, and the movement information of a moving body.

Figure 3:
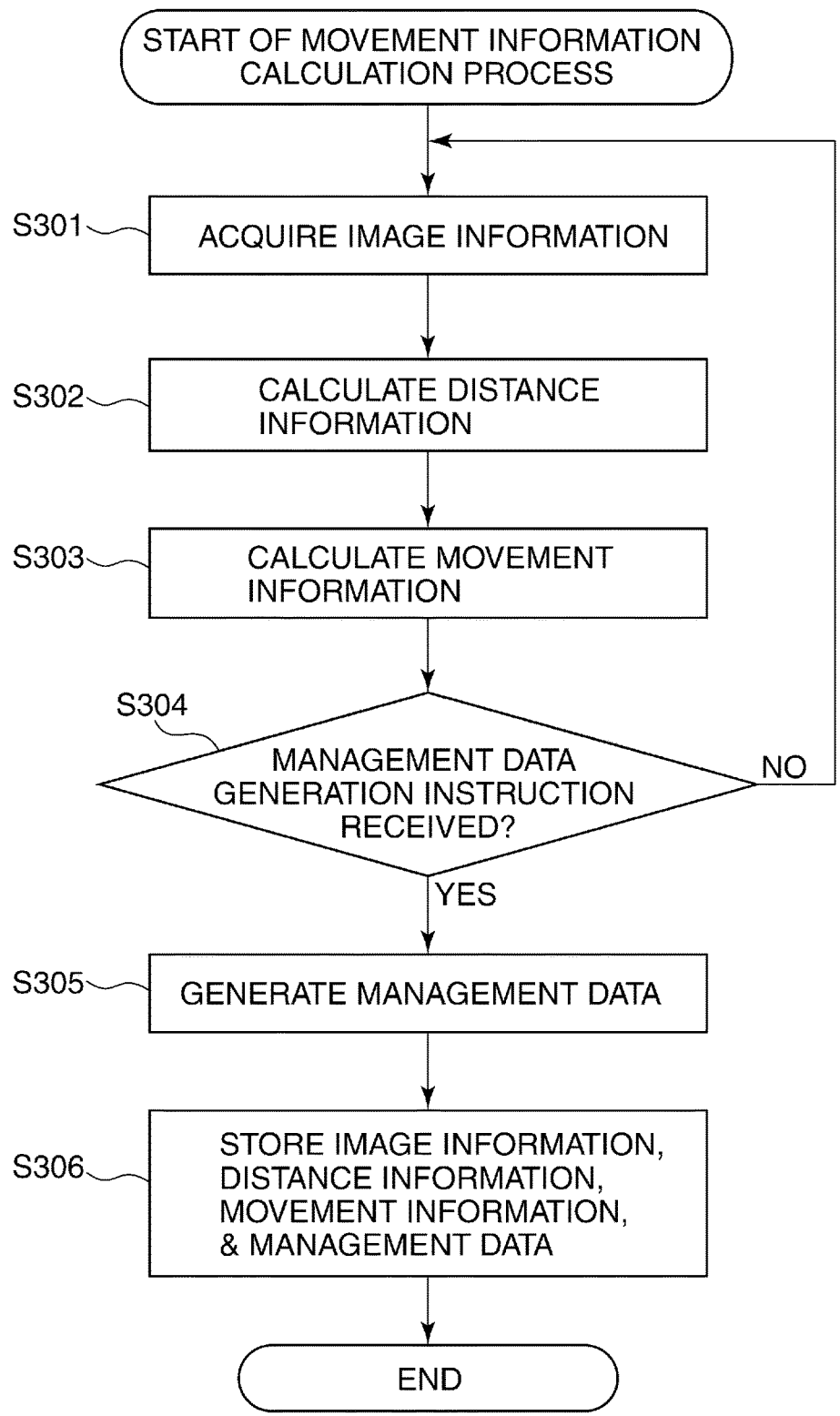
FIG. 3 is a flowchart of a movement information calculation process performed by the digital camera shown in FIG. 1.

FIG. 3 is a flowchart of the movement information calculation process performed by the digital camera 100 shown in FIG. 1.

The information calculation process in FIG. 3 is performed by the system controller 108 that executes various programs stored in the nonvolatile memory 110. Further, insofar as the image information and the movement information are stored in the memory 109 or the recording medium 115, the information calculation process in FIG. 3 can be performed any time by acquiring the stored image information and movement information. In the present embodiment, however, the description will be given of a case in which the information calculation process is performed during a time period between preview processing before photographing and the photographing, performed by the digital camera 100, by way of example.

Figure 4A:
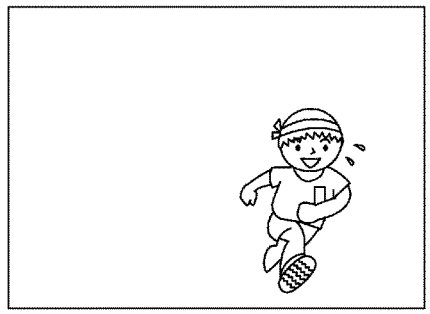
FIGS. 4A to 4G are diagrams useful in explaining the movement information used in the movement information calculation process in FIG. 3. More specifically.
Figure 4B:
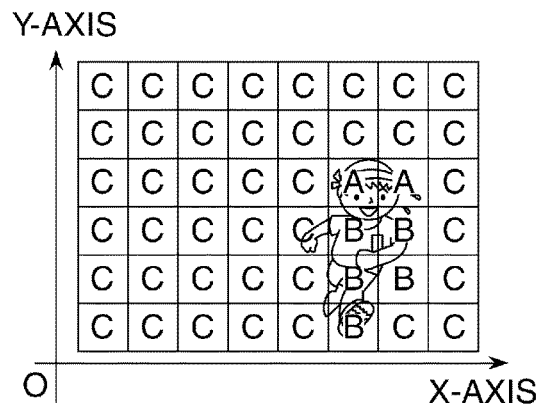
Figure 4C:
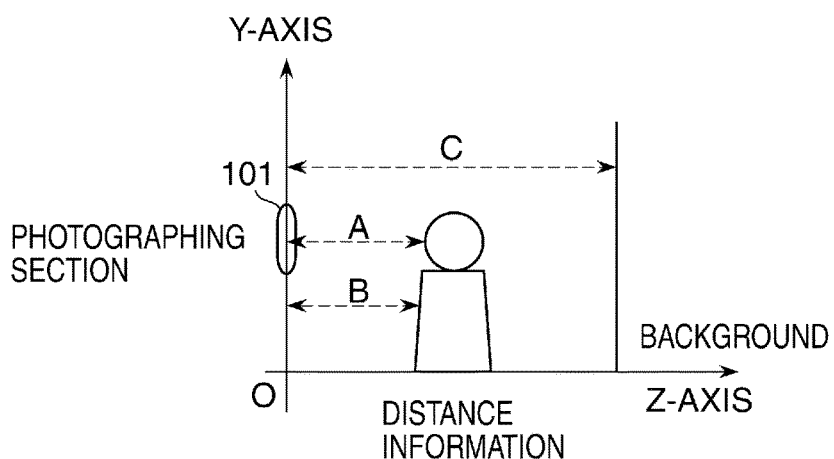

Referring to FIG. 3, first, the system controller 108 acquires a plurality of image information items at different times by the preview processing performed by the photographing section 101 (step S301). Then, the system controller 108 controls the distance information-calculating section 117 to calculate the distance information indicating a distance from the photographing section 101 to the object using each of the image information items acquired in the step S301 (step S302). More specifically, for example, when the image information shown in FIG. 4A is acquired, the distance information-calculating section 117 divides, as shown in FIG. 4B, the acquired image information into a plurality of blocks by equally dividing the image information into eight blocks with respect to an X-axis direction and six blocks with respect to a Y-axis direction. Then, the distance information-calculating section 117 acquires ranging information associated with each divided block from the ranging section 116, and calculates the distance information indicating a distance from the photographing section 101 to an object in each of the blocks based on the acquired ranging information. The distance information is a distance with respect to the Z-axis direction in FIG. 2. In the present embodiment, as shown in FIG. 4C, a distance C indicates the largest distance from the photographing section 101, a distance B indicates the smallest distance from the photographing section 101, and a distance A indicates a distance between the distance C and the distance B. Note that symbols "A", "B", and "C" added to the respective blocks in FIG. 4B represent information items of the distance A, B, and C of the blocks.

Figure 4D:
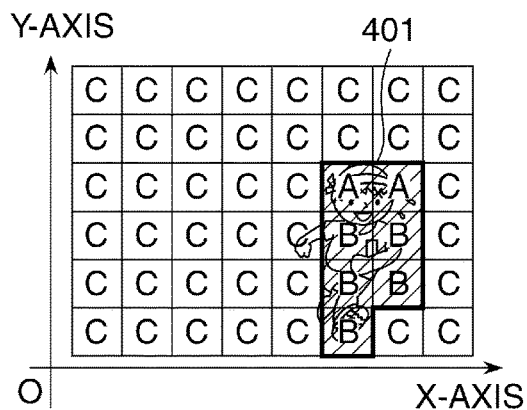

Then, the system controller 108 acquires the image information and the distance information (the operation of a distance information acquisition unit) and calculates the movement information of a moving body based on the acquired image information and distance information (step S303) (the operation of a calculation unit). More specifically, first, the movement information-calculating section 118 identifies an object area formed by blocks each including at least part of the object based on each of the image information items acquired in the step S301. In identifying the object area, for example, the movement information-calculating section 118 judges each block of which the distance information calculated in the step S302 is within a predetermined range as a block forming the same object area. Further, the movement information-calculating section 118 identifies an area formed by the blocks of which the distance information is within the predetermined range as an object area. In the present embodiment, a hatched area in FIG. 4D corresponding to the image information acquired in the step S301 that is formed by the blocks of which the distance information calculated in the step S302 is within the predetermined range, i.e. an area formed by the blocks of which the distance information is "A" or "B", is identified as an object area 401.

Figure 4E:
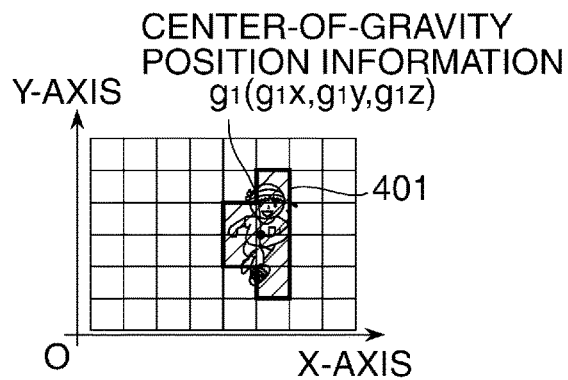
Figure 4F:
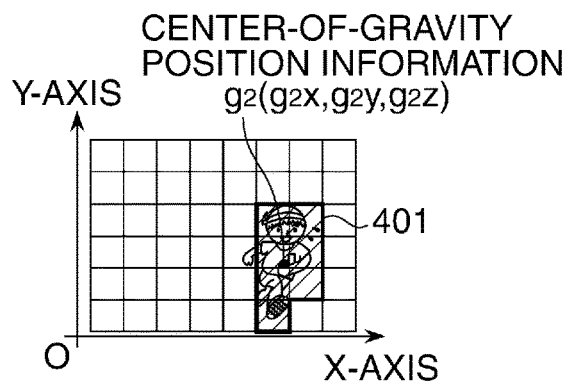
Figure 4G:
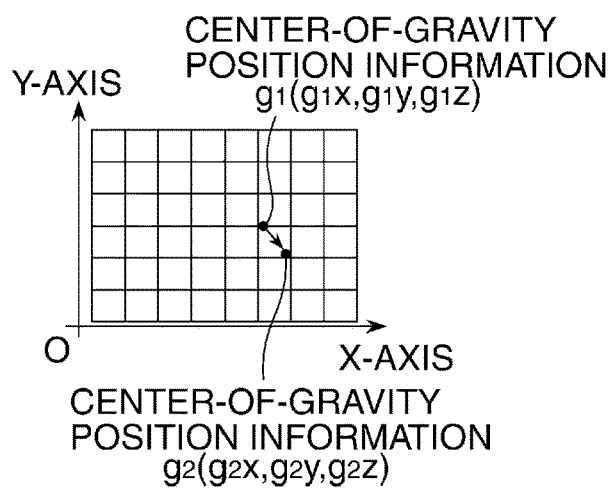

Next, the movement information-calculating section 118 identifies center-of-gravity position information g (gx, gy, gz) of the identified object area 401 (the operation of an identification unit). In the identification of the center-of-gravity position information g, there is identified center-of-gravity position information included in each of image information items acquired at different times, for example, the center-of-gravity position information g1 (g1x, g1y, g1z) of the identified object area 401 included in the image information of an n−1-th image (FIG. 4E) and the center-of-gravity position information g2 (g2x, g2y, g2z) of the identified object area 401 included in the image information of an n-th image (FIG. 4F). The movement information is calculated based on a difference in the identified center-of-gravity position information g between the temporally sequential image information items, for example, a difference between the identified center-of-gravity position information g1 (g1x, g1y, g1z) and center-of-gravity position information g2 (g2x, g2y, g2z), shown in FIG. 4G. The horizontal vector p of the movement information is a difference between g2x and g1x, the vertical vector q is a difference between g2y and g1y, and the depth vector r is a difference between g2z and g1z. In the present embodiment, if there is a difference between the center-of-gravity position information g1 and the center-of-gravity position information g2, it is determined that the object area 401 is an area indicative of a moving body (hereinafter referred to as the "moving body area"), whereas, if there is no difference between the center-of-gravity position information g1 and the center-of-gravity position information g2, it is determined that the object area 401 is not an area indicative of a moving body. Note that, in the present embodiment, the movement information may be calculated by calculating an arithmetic mean of the center-of-gravity position information g of the object area included in the image information of three or more temporally sequential images.

Then, the system controller 108 determines whether or not a management data generation instruction is received, for generating management data including information indicating association of the image information of the n-th image and the distance information and movement information associated with the n-th image information (step S304).

If it is determined in the step S304 that the management data generation instruction has been received, the system controller 108 generates the management data (step S305). Then, the system controller 108 stores the image information, distance information, movement information, and management data, described above, in the memory 109 or the recording medium 115 (step S306), followed by terminating the present process.

If it is determined in the step S304 that the management data generation instruction has not been received, the system controller 108 returns to the step S301.

According to the information calculation process described above with reference to FIG. 3, the movement information is calculated based on a difference between the center-of-gravity position information g1 ($g1x$, $g1y$, $g1z$) and the center-of-gravity position information g2 ($g2x$, $g2y$, $g2z$) of the object area 401 included in the n−1-th image and the n-th image, respectively. This makes it possible to reduce the information used for the movement information calculation process to a necessary minimum, and thereby reduce the load of the movement information calculation process.

Although in the above-described information calculation process in FIG. 3, the n-th image information corresponds to the last image information acquired in the preview processing, the image information from which the movement information is calculated by the information calculation process in FIG. 3 is not limited to the n-th image information. For example, the image information used for calculation of the movement information may be image information acquired at any given time in the preview processing.

Figure 5:
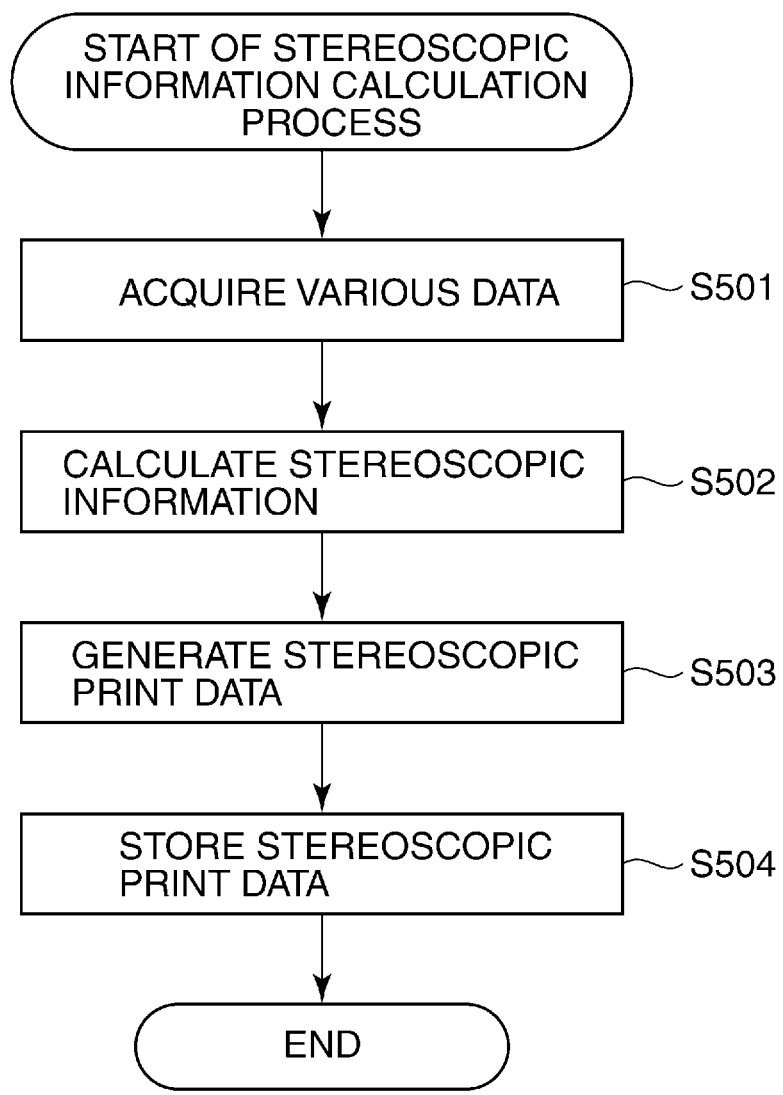
FIG. 5 is a flowchart of a stereoscopic information calculation process performed by the digital camera shown in FIG. 1.

FIG. 5 is a flowchart of the stereoscopic information calculation process performed by the digital camera 100 shown in FIG. 1.

The stereoscopic information calculation process in FIG. 5 is performed by the system controller 108 that executes various programs stored in the nonvolatile memory 110. Note that the stereoscopic information calculation process in FIG. 5 is performed during a time period after the information calculation process in FIG. 3 is terminated and before the stereoscopic print processing is started.

Figure 6:
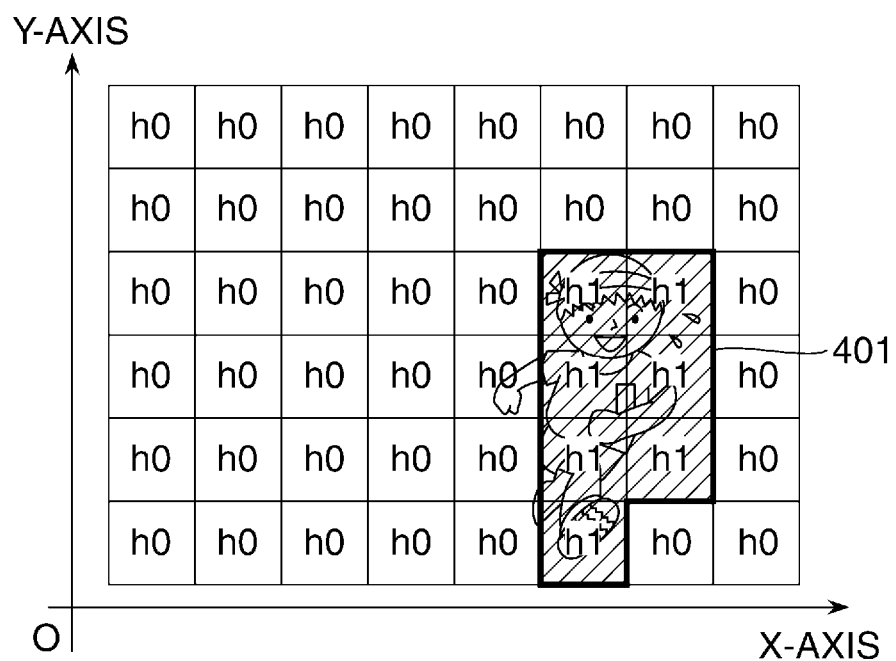
FIG. 6 is a diagram useful in explaining stereoscopic information used in the stereoscopic information calculation process in FIG. 5.

Referring to FIG. 5, first, the system controller 108 acquires the image information, the distance information, the movement information, and the management data, stored in the step S306 in FIG. 3 (step S501). Then, the system controller 108 causes the stereoscopic information-generating section 119 to calculate stereoscopic information B into which a factor of movement of a moving body is incorporated, based on the distance information, the movement information, and the management data, acquired in the step S501 (step S502). More specifically, first, the system controller 108 calculates stereoscopic information A that is information indicating protrusions and indentations of an object, based on the acquired distance information. The stereoscopic information A is formed by items of position information in three dimensions associated with the X-axis, the Y-axis, and the Z-axis, respectively (i.e. an X component, a Y component, and a Z component of a position vector). Further, the system controller 108 adds information providing a feeling of lively movement of a moving body to the stereoscopic information A, using the horizontal vector p, the vertical vector q, and the depth vector r of the acquired movement information. More specifically, the system controller 108 determines the Z component of the stereoscopic information A such that the Z component is increased as the scalar amounts of the horizontal vector p and the vertical vector q of the movement information are larger (the position information associated with the Z axis is offset) (the operation of a determination unit), to thereby generate the stereoscopic information B. That is, in the present embodiment, the two-dimensional movement of the moving body (movement of the moving body associated with the X-axis and movement associated with the Y-axis) is converted to a thickness of the object image. For example, in FIG. 6, the distance information of each block of the object area 401 that is a moving body area is set to "h1" to which the thickness is given according to the two-dimensional movement of the moving body, and the distance information of each block of other than the object area 401 is set to "h0" to which the thickness is not given. Although in the present embodiment, the Z component of the stereoscopic information A is increased only according to the scalar amounts of the horizontal vector p and the vertical vector q of the movement information, the Z component of the stereoscopic information A may be increased not only according to the scalar amounts of the horizontal vector p and the vertical vector q of the movement information, but also according to a scalar amount of the depth vector r.

Then, the system controller 108 controls the print data-generating section 120 to generate the stereoscopic print data based on the image information acquired in the step S501 and the stereoscopic information B calculated in the step S502 (step S503) (the operation of a generation unit). Then, the system controller 108 stores the generated stereoscopic print data in the memory 109 or the recording medium 115 (step S504), followed by terminating the present process.

According to the above-described information calculation process in FIG. 3 and the stereoscopic information calculation process in FIG. 5, the stereoscopic print data is generated based on the image information, the distance information, and the movement information. This makes it possible to process the stereoscopic information A that is generated based on the distance information indicating a distance to the object, based on the movement information indicating movement of a moving body, and hence, it is possible to generate the stereoscopic print data to which the factor of the movement of the moving body is incorporated, based on the processed stereoscopic information B. That is, it is possible to generate the stereoscopic print data that gives a printing result expressing a feeling of lively movement of an object.

Further, according to the information calculation process and the stereoscopic information calculation process described above with reference to FIGS. 3 and 5, respectively, as the scalar amount of each vector of the movement information is larger, the Z component of the stereoscopic information A is increased, whereby the thickness of the object image is increased. As a result, as the speed of movement of a moving body is higher, the object image in the printing result appears closer to a viewer, and hence, it is possible to generate the stereoscopic print data that enables a viewer to easily visually recognize the speed of the movement of the moving body.

In the above-described stereoscopic information calculation process in FIG. 5, an increased amount of the Z component in the stereoscopic information A, determined based on at least one of the horizontal vector p, the vertical vector q, and the depth vector r of the movement information that is desired by the user to emphasize the movement of the object, may be defined to be larger than an increased amount in the stereoscopic information A that is determined based on the other vectors. As a result, for example, by making an increased amount of the Z component in the stereoscopic information A, determined based on the horizontal vector p of the vectors of the stereoscopic information, larger than an increased amount in the stereoscopic information A, determined based on the other vectors, it is possible to generate the stereoscopic print data that emphasizes movement of the moving body in the X direction.

The embodiment of the invention has been described heretofore, but the invention is not limited to the above-described embodiment.

For example, although in the above-described embodiment, the movement information of an object is calculated based on a difference in center-of-gravity position information g of the object area between a plurality of image information items, the movement information of an object may be calculated based on a difference in distance information of part of the object in each divided block between the image information items.

Figure 7:
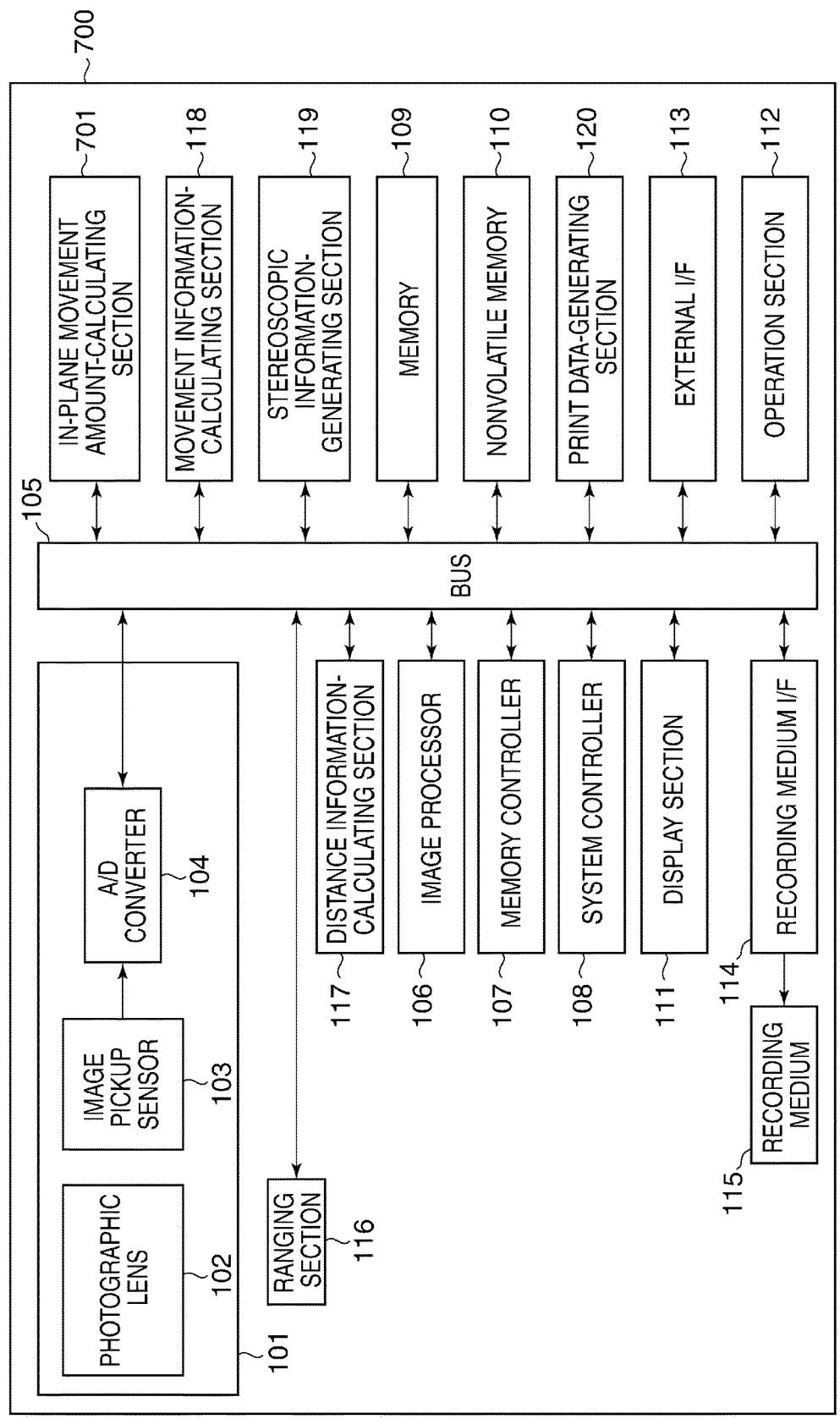
FIG. 7 is a schematic block diagram of a variation of the digital camera shown in FIG. 1.

FIG. 7 is a schematic block diagram of a variation of the digital camera 100 shown in FIG. 1.

This variation basically has the same configuration and performs the same operation as the above-described embodiment. Therefore, redundant description of the same configuration and same operation is omitted, and the following detailed description will be given only of the different configuration and the different operation from the above-described embodiment.

Referring to FIG. 7, a digital camera 700 includes not only the components of the digital camera 100, but also an in-plane movement amount-calculating section 701. The in-plane movement amount-calculating section 701 is also connected to the other components via the bus 105.

The in-plane movement amount-calculating section 701 calculates an in-plane movement vector based on a plurality of image information items acquired by the photographing section 101 at different times. More specifically, the in-plane movement amount-calculating section 701 divides each acquired image information into a plurality of blocks, and calculates an in-plane movement vector of predetermined part of an object in each divided block.

Figure 8:
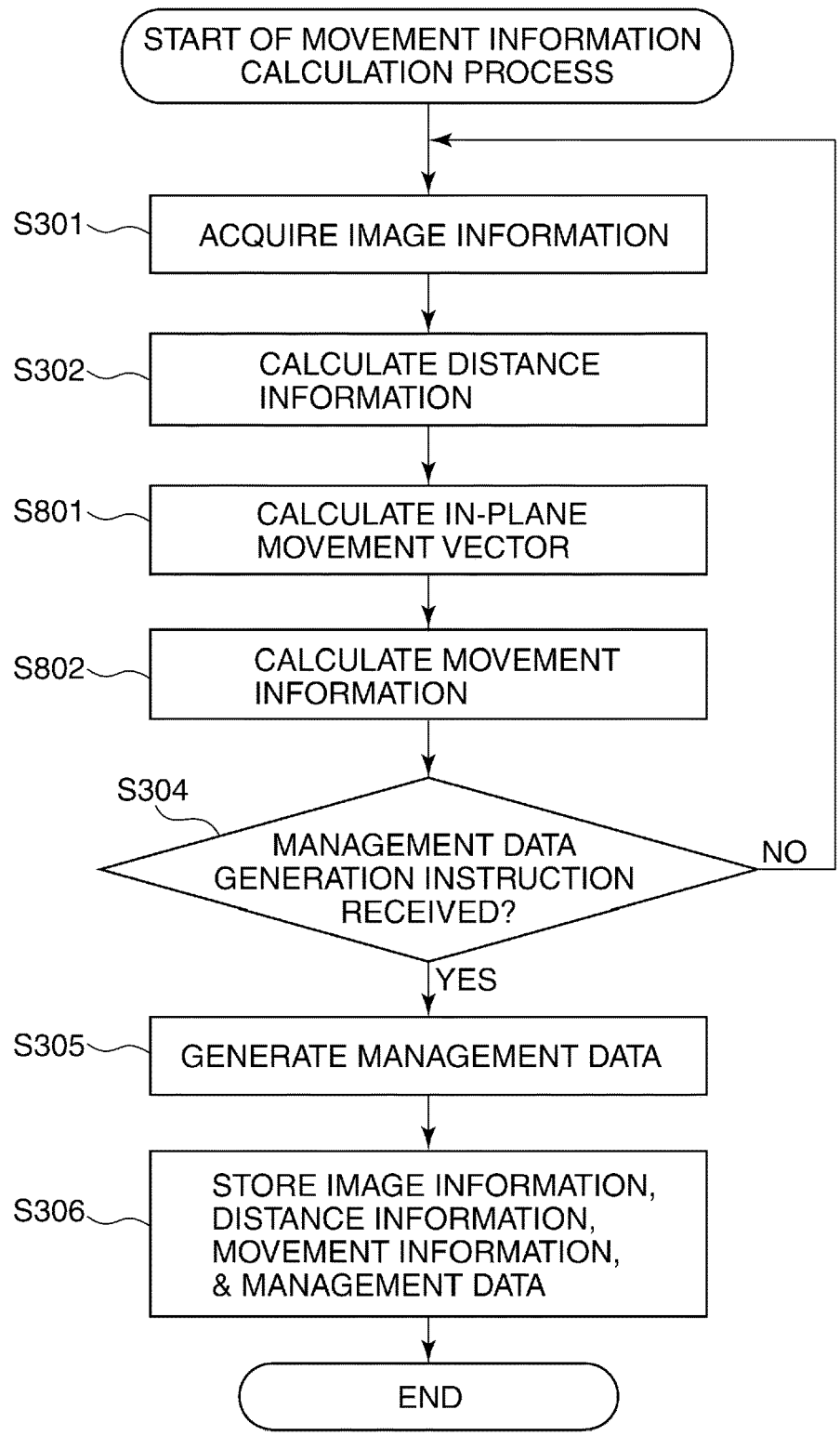
FIG. 8 is a flowchart of a variation of the movement information calculation process in FIG. 3.

FIG. 8 is a flowchart of a variation of the movement information calculation process in FIG. 3.

The movement information calculation process in FIG. 8 is performed by the system controller 108 that executes various programs stored in the nonvolatile memory 110. The movement information calculation process in FIG. 8 is also performed during a time period between preview processing before photographing and the photographing, performed by the digital camera 700, by way of example.

Figure 9A:
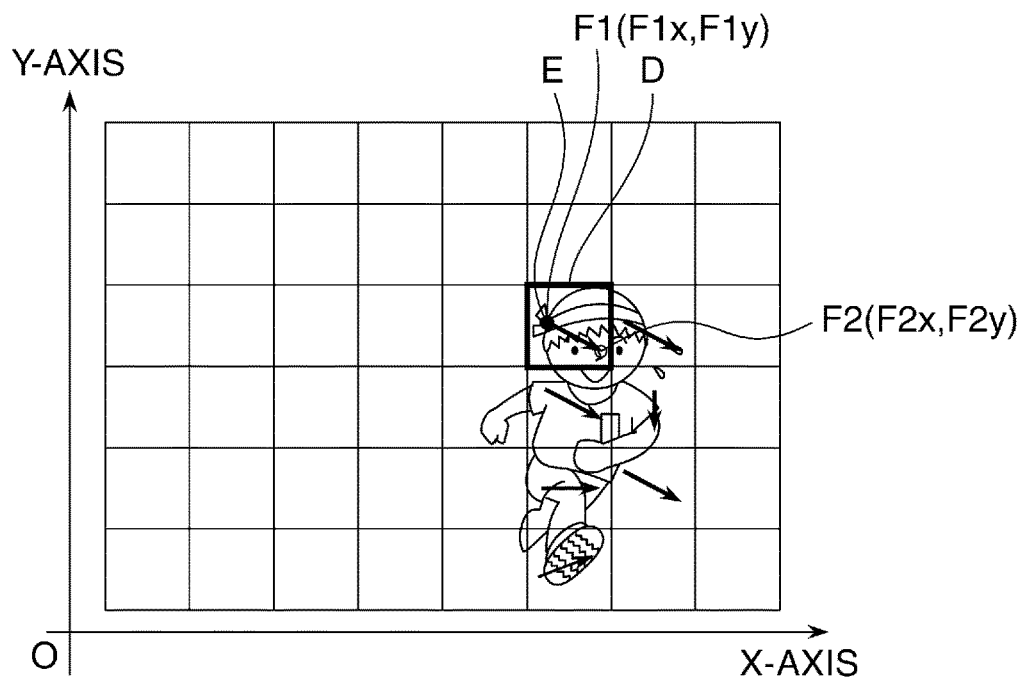
FIGS. 9A and 9B are diagrams useful in explaining movement information used in the variation in FIG. 8.
Figure 9B:
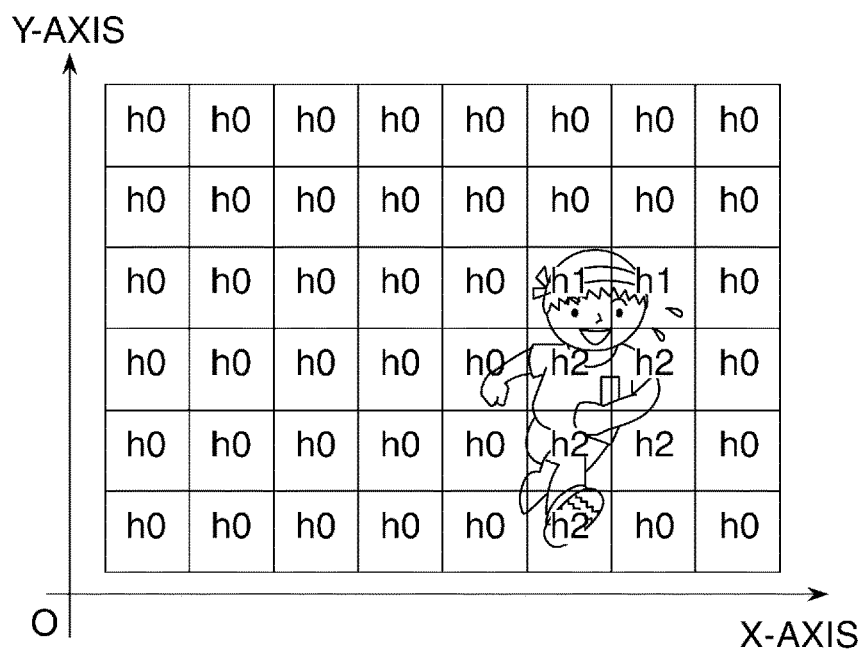

Referring to FIG. 8, first, the same processing as in the steps S301 and S302 in FIG. 3 is performed. Then, the system controller 108 controls the in-plane movement amount-calculating section 701 to calculate the in-surface movement vector in each block in the image information (step S801). More specifically, the in-plane movement amount-calculating section 701 detects position information F1 (F1$x$, F1$y$) of part E of an object in each block of the n−1-th image information, for example, in a block D appearing in FIG. 9A. The position information F1 (F1$x$, F1$y$) is formed by position information of two dimensions represented by the X-axis and the Y-axis in FIGS. 9A and 9B. Then, the in-plane movement amount-calculating section 701 detects position information F2 (F2$x$, F2$y$) of the part E of the object in the block D of the n-th image information, and calculates an in-plane movement vector of the block D based on a difference between the position information F1 and the position information F2. The in-plane movement amount-calculating section 701 performs the same processing with respect to the other blocks, whereby the in-plane movement vectors of the respective blocks are calculated.

Then, the system controller 108 calculates the movement information of the object based on the in-plane movement vectors calculated in the step S801 and the distance information acquired in the step S302 (step S802). In the step S802, the X and Y components of the in-plane movement vector calculated in the step S801 and the X and Y components of the position information in the X-axis and Y-axis directions in the distance information are synthesized to thereby calculate the X and Y components (the horizontal vector p and the vertical vector q) of the movement information. Further, the position information in the Z-axis direction in the distance information becomes a Z component (depth vector r) of the movement information. Then, the system controller 108 performs the same processing as the steps S304 to S306 in FIG. 3, followed by terminating the present process. Note that the in-plane movement vector is not calculated in a block where the part E of the object is not included, and as a result, the movement information is not calculated either.

Although, in the above-described movement information calculation process in FIG. 8, the n-th image information corresponds to the last image information acquired in the preview processing, the image information from which the movement information is calculated using the movement information calculation process in FIG. 8 is not limited to the n-th image information. For example, the image information used for calculation of the movement information may be image information acquired at any given time in the preview processing.

According to the above-described movement information calculation process in FIG. 8, the n−1-th image information and the n-th image information, acquired in the preview processing, are divided into a plurality of blocks, respectively. Further, in the n−1-th image information and the n-th image information, the in-plane movement vectors of the divided blocks included in the n-th image information are calculated based on a difference between the position information F1 and the position information F2 of the part E of the object in each divided block. As a consequence, the in-plane movement vectors are calculated in the respective blocks, and hence, by partially processing the stereoscopic print data according to each in-plane movement vector, it is possible to cause the movement of part of the object associated with each block to be individually reflected on a printing result, making it possible to provide a clear expression of the movement of each part of the object. As a result, it is possible to generate stereoscopic print data that gives a printing result expressing a feeling of lively movement of an object more.

More specifically, in each block including the part E of the object, the stereoscopic information of the part E of the object is generated based on the movement information of the corresponding block. That is, as the scalar amounts of the horizontal vector p and the vertical vector q in the movement information of each block are larger, the Z component of the stereoscopic information of the part E of the object is increased, and the two-dimensional movement of the part E of the object is converted to a partial thickness of the object image on a block-by-block basis. For example, in FIG. 9B, the distance information of blocks including the part E of the object is set to "h1" to which the thickness is added according to the two-dimensional movement of the part E of the object in the corresponding blocks. Further, the distance information of the other blocks including the part E of the object is set to "h2" to which the thickness is added according to the two-dimensional movement of the part E of the object in the corresponding other blocks.

Although in the above-described movement information calculation process in FIG. 8, when calculating the movement information of the object, the Z component of the movement information is calculated using the distance information, the movement information of the object may be calculated using only the in-plane movement vector. That is, it is not necessarily required to calculate the Z component of the movement information. This makes it possible to calculate the movement information of an object, even when the distance information of the object cannot be acquired or the accuracy of calculation of the distance information is low, due to the photographing condition, whereby it is possible to generate stereoscopic print data that gives a printing result expressing a feeling of lively movement of an object.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) a photographing section that acquires a first image of an object and a second image of the object, the first image and the second image being acquired at different times, and each including an object image of the object and a background portion;
   (B) at least one memory that stores instructions; and
   (C) at least one processor coupled to the at least one memory, and configured to execute the instructions to cause the image processing apparatus to function as:
      (a) a distance information acquisition unit configured to acquire distance information associated with the object image included in each of the first image and the second image, the distance information corresponding to a distance in a depth direction of the object, and indicating a distance from the photographing section to the object;
      (b) a movement vector calculation unit configured to calculate a movement vector of the object image in a horizontal direction, a vertical direction, and the depth direction, based on position information of the object image included in each of the first image and the second image;
      (c) a thickness determination unit configured to determine a thickness of the object image, in the depth direction, included in each of the first image and the second image according to at least one of a horizontal component and a vertical component of the movement vector;
      (d) a generation unit configured to generate stereoscopic print data based on (i) the second image, (ii) the distance information associated with the object image included in the second image and acquired by the distance information acquisition unit, (iii) the movement vector calculated by the movement vector calculation unit, and (iv) the determined thickness of the object image, by increasing a depth component of the position information of the object image included in the second image based on the at least one of the horizontal component and the vertical component of the movement vector, wherein the generation unit increases the thickness of the object image based on an increase of a scalar amount of the at least one of the horizontal component and the vertical component of the movement vector, without increasing a thickness of the background portion of the second image; and
      (e) a storing unit that stores the generated stereoscopic print data in one of a second memory and a recording medium.

2. The image processing apparatus according to claim 1, wherein the image processing apparatus further functions as (f) an identification unit configured to identify center-of-gravity position information of the object image included in each of the first image and the second image, and
   wherein the movement vector calculation unit calculates the movement vector based on a difference in the center-of-gravity position information of the object image included in the first image and the center-of-gravity position information of the object image included in the second image.

3. The image processing apparatus according to claim 1, wherein the movement vector calculation unit divides each of the first image and the second image into a plurality of blocks, and calculates the movement vector of the object image included in the second image, based on a difference in position of part of the object image corresponding to each of the blocks between the first image and the second image.

4. The image processing apparatus according to claim 1, wherein the movement vector includes the horizontal component, the vertical component, and a depth component, and
   wherein the thickness determination unit determines the thickness of the object image based on both of the horizontal component and the vertical component of the movement vector.

5. A method of controlling an image processing apparatus, the method comprising:
   acquiring a first image of an object and a second image of the object, the first image and the second image being acquired at different times, and each including an object image of the object and a background portion;

acquiring distance information associated with the object image included in each of the first image and the second image, the distance information corresponding to a distance in a depth direction of the object, and indicating a distance from the photographing section to the object;

calculating a movement vector of the object image, at least in a horizontal direction, a vertical direction, and the depth direction, based on position information of the object image included in each of the first image and the second image;

determining a thickness of the object image, in the depth direction, included in each of the first image and the second image according to at least one of a horizontal component and a vertical component of the movement vector;

generating stereoscopic print data based on (i) the second image, (ii) the acquired distance information associated with the object image included in the second image, (iii) the calculated movement vector, and (iv) the determined thickness of the object image, by increasing a depth component of the position information of the object image included in the second image based on the at least one of the horizontal component and the vertical component of the movement vector, wherein, during the generation of the stereoscopic print data, the thickness of the object image is increased based on an increase of a scalar amount of the at least one of the horizontal component and the vertical component of the movement vector, without increasing a thickness of the background portion of the second image; and storing, in one of a memory and a recording medium, the generated stereoscopic print data.

6. The method according to claim 5, further comprising identifying center-of-gravity position information of the object image included in each of the first image and the second image,
wherein the movement vector is calculated based on a difference in the center-of-gravity position information of the object image included in the first image and the center-of-gravity position information of the object image included in the second image.

7. The method according to claim 5, wherein, during the calculating step, each of the first image and the second image is divided into a plurality of blocks, and the movement vector of the object image included in the second image is calculated based on a difference in position of part of the object image corresponding to each of the blocks between the first image and the second image.

8. The method according to claim 5, wherein the movement vector includes the horizontal component, the vertical component, and a depth component, and the thickness of the object image is determined based on both of the horizontal component and the vertical component of the movement vector.

9. A non-transitory computer-readable storage medium storing a computer-executable program for executing a method of controlling an image processing apparatus, wherein the method comprises:
acquiring a first image of an object and a second image of the object, the first image and the second image being acquired at different times, and each including an object image of the object and a background portion;

acquiring distance information associated with the object image included in each of the first image and the second image, the distance information corresponding to a distance in a depth direction of the object, and indicating a distance from the photographing section to the object;

calculating a movement vector of the object image, at least in a horizontal direction, a vertical direction, and the depth direction, based on position information of the object image included in each of the first image and the second image;

determining a thickness of the object image, in the depth direction, included in each of the first image and the second image according to at least one of a horizontal component and a vertical component of the movement vector;

generating stereoscopic print data based on (i) the second image, (ii) the acquired distance information associated with the object image included in the second image, (iii) the calculated movement vector, and (iv) the determined thickness of the object image, by increasing a depth component of the position information of the object image included in the second image based on the at least one of the horizontal component and the vertical component of the movement vector, wherein, during the generation of the stereoscopic print data, the thickness of the object image is increased based on an increase of a scalar amount of the at least one of the horizontal component and the vertical component of the movement vector, without increasing a thickness of the background portion of the second image; and storing, in one of a memory and a recording medium, the generated stereoscopic print data.

10. The non-transitory computer-readable storage medium according to claim 9, wherein the method further comprises identifying center-of-gravity position information of the object image included in each of the first image and the second image, and
wherein the movement vector is calculated based on a difference in the center-of-gravity position information of the object image included in the first image and the center-of-gravity position information of the object image included in the second image.

11. The non-transitory computer-readable storage medium according to claim 9, wherein, during the calculating step, each of the first image and the second image is divided into a plurality of blocks, and the movement vector of the object image included in the second image is calculated based on a difference in position of part of the object image corresponding to each of the blocks between the first image and the second image.

12. The non-transitory computer-readable storage medium according to claim 9, wherein the movement vector includes the horizontal component, the vertical component, and a depth component, and the thickness of the object image is determined based on both of the horizontal component and the vertical component of the movement vector.

* * * * *